United States Patent
Macklin et al.

(10) Patent No.: US 11,270,041 B2
(45) Date of Patent: Mar. 8, 2022

(54) POSITION-BASED DYNAMICS SIMULATION

(71) Applicant: Nvidia Corporation, Santa Clara, CA (US)

(72) Inventors: Miles Macklin, Auckland (NZ); Matthias Müller, Uerikon (CH); Nuttapong Chentanez, Santa Clara, CA (US)

(73) Assignee: NVIDIA Corporation, Santa Clara, CA (US)

(*) Notice: Subject to any disclaimer, the term of this patent is extended or adjusted under 35 U.S.C. 154(b) by 560 days.

(21) Appl. No.: 16/140,336

(22) Filed: Sep. 24, 2018

(65) Prior Publication Data
US 2019/0095558 A1 Mar. 28, 2019

Related U.S. Application Data

(60) Provisional application No. 62/562,958, filed on Sep. 25, 2017.

(51) Int. Cl.
*G06F 30/20* (2020.01)
*G06F 17/11* (2006.01)
*G06F 17/16* (2006.01)
*G06F 113/12* (2020.01)

(52) U.S. Cl.
CPC .............. *G06F 30/20* (2020.01); *G06F 17/11* (2013.01); *G06F 17/16* (2013.01); *G06F 2113/12* (2020.01)

(58) Field of Classification Search
CPC .......... G06F 30/20; G06F 17/11; G06F 17/16; G06F 2113/12
See application file for complete search history.

(56) References Cited

U.S. PATENT DOCUMENTS

| 7,079,145 B2 | 7/2006 | Tonge et al. |
| 7,363,199 B2 | 4/2008 | Reynolds et al. |
| 7,385,603 B2 | 6/2008 | Piponi |

(Continued)

FOREIGN PATENT DOCUMENTS

WO 2017/027957 A1 2/2017

OTHER PUBLICATIONS

Francu et al. "Unified Simulation of Rigid and Flexible Bodies Using Position Based Dynamics", Apr. 2017, Workshop on Virtual Reality Interaction and Physical Simulation VRIPHYS, pp. 49-58. (Year: 2017).*

(Continued)

*Primary Examiner* — Kamini S Shah
*Assistant Examiner* — Russ Guill
(74) *Attorney, Agent, or Firm* — Shook, Hardy & Bacon L.L.P.

(57) ABSTRACT

Embodiments of the present invention provide a position-based dynamics approach for simulating objects using a set of points and constraints, applied as equations that restrict the relative motion of bodies. Forces are applied to the points to move them, and the constraints ensure that the points will not move in a way that is inconsistent with rules of the simulation. The present invention improves upon existing PBD approaches by using regularized constraints that directly correspond to well-defined energy potentials, and which can advantageously be solved independent of time step and iteration count.

27 Claims, 6 Drawing Sheets

DEFORMABLE CLOTH SIMULATION

(56) References Cited

U.S. PATENT DOCUMENTS

| | | | |
|---|---|---|---|
| 7,505,883 | B2 | 3/2009 | Leprevost |
| 7,616,204 | B2 | 11/2009 | Muller et al. |
| 8,140,304 | B2 | 3/2012 | Ko et al. |
| 8,392,154 | B2 | 3/2013 | Choi |
| 8,803,887 | B2 | 8/2014 | McAdams et al. |
| 9,440,148 | B2 | 9/2016 | Bond et al. |
| 2006/0262113 | A1 | 11/2006 | Leprevost |
| 2015/0029198 | A1 | 1/2015 | Sumner et al. |
| 2015/0161810 | A1* | 6/2015 | Macklin ............... G06T 13/60 345/474 |
| 2015/0242546 | A1 | 8/2015 | Jeon et al. |

OTHER PUBLICATIONS

Barbic et al. "Time-critical distributed contact for 6-DoF haptic rendering of adaptively sampled reduced deformable models", 2007, Eurographics/ACM SIGGRAPH Symposium on Computer Animation, pp. 171-180. (Year: 2007).*

Want, Huamin. "A Chebyshev Semi-Iterative Approach for Accelerating Projective and Position-based Dynamics", Nov. 2015, ACM Transactions on Graphics, vol. 34. No 6, Article 246, 9 pages. (Year: 2015).*

Bouaziz et al. "Projective Dynamics: Fusing Constraint Projections for Fast Simulation", Jul. 2014, ACM Transactions on Graphics, vol. 33, No. 4, Article 154, 11 pages. (Year: 2014).*

Tsai, Tsung-Chih. "Position Based Dynamics", Jun. 13, 2017, Encyclopedia of Computer Graphics and Games, 5 pages. (Year: 2017).*

Francu, Mihai. "Unified Simulation of Rigid and Flexible Bodies Using Constrained Dynamics", Jun. 2016, Thesis, 186 pages. (Year : 2016).*

Jong-Hwan Kim, "Evolutionary programming techniques for constrained optimization problems," 1997, Transactions on evolutionary computation, vol. 1, No. 2, pp. 129-140 (Year: 1997).*

Jan Bender et al., "Position-based methods for the simulation of solid objects in computer graphics," 2013, EUROGRAPHICS 2013 State of the Art Reports, 22 pages (Year: 2013).*

Rony Goldenthal et al., "Efficient simulation of inextensible cloth," 2007, ACM Transactions on Graphics, vol. 26, No. 3, Article 49, 8 pages (Year: 2007).*

Mihai Francu et al., Cloth simulation using soft constraints, 2015, Conference: WSCG 2015 At: Plzen, Czech Republic Volume: Journal of WSCG, vol. 23, No. 1, 11 pages (Year: 2015).*

"XPBD: Position-based simulation of compliant constrained dynamics," Sep. 14, 2016, Wayback Machine page:https://www.physicsbasedanimation.com/2016/09/13/xpbd-position-based-simulation-of-compliant-constrained-dynamics/, 1 page (Year: 2016).*

Marco Fratarcangeli & Fabio Pellacini (2013), A GPU-Based Implementation of Position Based Dynamics for Interactive Deformable Bodies, Journal of Graphics Tools, 17:3, 59-66, DOI 10.180/2165347X.2015.1030525, 19 pages.

Ryo Kondo, Takashi Kanai, Ken-Ichi Anjyo, Directable Animation of Elastic Objects, Keio University, Japan, Riken, Integrated Volume-CAD System Research Program, Japan, OLM Digital, Inc., Eurgraphics/ACM SIGGRAPH Symposium on Computer Animation (2005), 20 pages.

David Baraff, Linear-Time Dynamics using Lagrange Multipliers, SIGGRAPH 96, New Orleans, Aug. 4-9, Computer Graphics Proceedings, Annual Conference Series, 1996, Robotics Institute Carnegie Mellon University, 10 pages.

M. Francu, F. Moldoneanu, Position based simulation of solids with accurate contact handling, Computers & Graphics (2017), https://doi.org/10310161/j.cag.2017309.004, 12 pages.

Bender, J. et al., "Position-Based Simulation of Continuous Materials", Computers & Graphics, pp. 1-11 (Jul. 10, 2014).

Bender, J. et al., "A Survey on Position-Based Simulation Methods in Computer Graphics", Computer Graphics Forum, pp. 1-25 (2014).

Bouaziz, S. et al., "Projective Dynamics: Fusing Constraint Projections for Fast Simulation", ACM Transactions on Graphics, pp. 1-11 (2014).

Goldenthal, R. et al., "Efficient Simulation of Inextensible Cloth", ACM SIGGRAPH conference proceedings, pp. 1-7 (2007).

Guennebaud, G. and Jacob, B. "Eigen is a C++ template library for linear algebra: matrices, vectors, numerical solvers, and related algorithms", Retrieved from Internet URL : http://eigen.tuxfamily.org., Eigen, accessed on Jan. 6, 2021, pp. 13 (2010).

Liu, T. et al., "Fast Simulation of Mass-Spring Systems", ACM Transaction on Graphics, vol. 32, Issue 6, pp. 1-7 (2013).

Muller, M. et al., "Meshless Deformations Based on Shape Matching", ACM SIGGRAPH, pp. 1-8 (2005).

Muller, M. et al., "Position Based Dynamics", Workshop in Virtual Reality Interactions and Physical Simulation, pp. 1-10 (2006).

Maciel, A. et al., "Using The Physx Engine For Physics-Based Virtual Surgery With Force Feedback", Int J Med Robot, vol. 5, Issue 3, pp. 1-30 (Sep. 2010).

Muller, M. et al., "Strain Based Dynamics", ACM SIGGRAPH Symposium on Computer Animation, pp. 1-9 (2014).

Nealen, A. et al., "Physically Based Deformable Models in Computer Graphics", EUROGRAPHICS—State of The Art Report, pp. 1-24 (2005).

Narain, R. et al., "ADMM Projective Dynamics: Fast Simulation of General Constitutive Models", ACM SIGGRAPH Symposium on Computer Animation, pp. 21-28 (2016).

Servin, M. et al., "Interactive Simulation of Elastic Deformable Materials", SIGRAD Conference, pp. 22-32 (2006).

Stam, J. "Nucleus: Towards a Unified Dynamics Solver for Computer Graphics", IEEE, pp. 1-11 (2009).

Tournier, M. et al., "Stable Constrained Dynamics", ACM Transactions on Graphics, pp. 1-10 (2015).

Wang, H. "A Chebyshev Semi-Iterative Approach for Accelerating Projective and Position-based Dynamics", ACM Transactions on Graphics, vol. 34, Issue 6, Article 246, pp. 1-9 (Nov. 2015).

* cited by examiner

POSITION-BASED DYNAMICS SIMULATION

CROSS-REFERENCES TO RELATED APPLICATIONS

This Application claims the benefit of U.S. Provisional Patent Application No. 62/562,958, filed Sep. 25, 2017, which is incorporated by reference in its entirety.

FIELD

Embodiments of the present invention generally relate to the field of computer implemented systems and methods involving the simulation of physical objects and materials. More specifically, embodiments of the present invention relate to computer implemented position-based simulations of deformable physical objects and materials using compliant constraints.

BACKGROUND

Position-Based Dynamics (PBD) is a well-known technique in the field of computer implemented simulations, with uses in games, medical simulations, training simulations, and other interactive applications, etc., as well as in film and other media. PDB is a method used to simulate physical phenomena like cloth, deformation, fluids, fractures, rigidness and much more. The key process in PBD is to simulate the object as a set of points and constraints. Constraints are kinematic restrictions in the form of equations and inequalities that constrain (e.g., restrict) the relative motion of bodies. Forces are applied to the points to move them, and the constraints ensure that the points will not move in a way that violates the rules of the simulation.

PBD is particularly attractive due to its simplicity and robustness; however, some limitations of PBD have yet to be sufficiently addressed or improved. For example, one well-known limitation of PDB is that the results produced are dependent on the time step and iteration count of the simulation. Specifically, PBD constraints become arbitrarily stiff as the iteration count increases, or as the time step decreases. This coupling of parameters is especially problematic when PBD is used to simulate scenes that include a variety of materials of different types, particularly where soft bodies interact with more rigid bodies.

In the case of a relatively soft body interacting with a relatively rigid body, raising the iteration counts to obtain the desired stiffness for one object in the simulation may inadvertently change the behavior of all other objects in the simulation. Therefore, the stiffness coefficients often must be re-tuned globally, unfortunately making the creation of reusable simulation assets extremely difficult. Iteration count dependence is also a known limitation of PBD, even in the case of a single deformable asset. For instance, the relative stiffness of stretch and bending constraints in a cloth model are both iteration count dependent, and further, the effects of iteration count are non-linear, making it very difficult to intuitively adjust parameters manually, or to rescale stiffness values as a simple function of iteration count.

Moreover, a recent resurgence in virtual-reality technology has given rise to a demand for higher fidelity real-time simulations that more accurately represent or approximate physical laws of nature. At the same time, the wide-spread use of haptic feedback devices has given rise to a need for simulation methods than can provide accurate force estimates. As PBD does not include a well-defined concept of constraint force, there exists a great need to improve existing PBD methods to provide accurate force estimates for simulated objects and materials.

SUMMARY

The present nvention improves upon existing PBD approaches for simulating deformable bodies using set of points and constraints, applied as equations that restrict the relative motion of bodies. Forces are applied to the points to move them, and the constraints ensure that the points will not move in a way that is inconsistent with the rules of the simulation. For example, when simulating a cloth object, the physical nature of the cloth material is modeled using constraint equations such that one portion of the cloth object can only be moved so far away from another portion of the cloth object (a stretch constraint); a simulated cloth object that can be stretched without limitation would violate the constraint and produce an unrealistic result.

Embodiments of the present invention accurately and efficiently simulate elastic and dissipative energy potentials in an implicit manner that is independent of the iteration count and time step of the underlying simulation. The disclosed methods address the well-known problems of iteration and time step dependent stiffness by introducing a new constraint formulation that corresponds to a well-defined concept of elastic potential energy, and introduces the concept of a total Lagrange multiplier to provide constraint force estimates that can be used to drive force dependent effects and devices, such as haptic feedback devices.

Accordingly, embodiments of the present invention provide systems and methods for executing a position-based dynamics simulation using regularized constraints that directly correspond to well-defined energy potentials, and which can advantageously be solved independently of time step and iteration count. In one embodiment, the constraints are represented as kinematic restrictions that constrain the relative motion of bodies, and are generally represented as functions of position and orientation variables, linear and angular velocities, and the derivatives thereof to any order. The simulations are generally performed on a computer system and the results may be visualized on a computer display or screen. The novel simulation method addresses the problems of iteration and time-step dependent stiffness by introducing a constraint formulation that corresponds to a well-defined concept of elastic potential energy. The simulation method can be realized as a modification to the PBD algorithm by introducing auxiliary variables which correspond to the traditional concept of a Lagrange multiplier.

More specifically, some embodiments of the present invention are realized as computer implemented methods and include initializing a Lagrange multiplier using a value of zero for a first iteration, computing a Lagrange multiplier change $\Delta\lambda$, where $\Delta\lambda$ represents the incremental change in force applied to a constraint during an iteration, and updating a total amount of force $\lambda$ applied to the constraint using the incremental value. Subsequent particle positions can be determined based on the Lagrange multiplier change $\Delta\lambda$, and the total amount of force $\lambda$ may be provided to a haptic feedback device that produces a physical force corresponding to the total amount of force $\lambda$.

According to one embodiment of the present invention, a method of simulating a deformable object is described having a plurality of particles and includes: a) defining a current position and a current velocity for a particle among the plurality of particles; b) generating an estimated next position for the particle based on the current position and the current velocity; c) computing an incremental constraint force magnitude of a constraint of a plurality of constraints of the particle based on a total constraint force magnitude of the constraint; d) computing an incremental position change of the constraint using the incremental constraint force magnitude; e) updating the total constraint force magnitude of the constraint by summing therewith the incremental constraint force magnitude; f) updating a total position change of the constraint by summing therewith the incremental position change; and g) updating the estimated next position based on the total position change of the constraint and then computing a next position and a next velocity for the particle based on the current position and the estimated next position.

According to another embodiment, c)-f) are performed for more than one constraint of the plurality of constraints, prior to performing g). According to further embodiments, c)-f) are performed for each constraint of the plurality of constraints.

According to another embodiment, a method of simulating a dynamic object having a plurality of particles is disclosed. The method includes defining a current position and a current velocity for the particles, determining multipliers for a plurality of positional constraints of the particles over a plurality of iterations, where the multipliers regularize the positional constraints and correspond to an elastic potential energy of the constraints, and determining subsequent positions of the particles based on the current position, the plurality of positional constraints, and the multipliers.

According to a third embodiment, a method of updating a position of a particle associated with a dynamic object in a dynamic object simulation includes computing a Lagrange multiplier for the particle according to an elastic potential energy of a constraint acting on the particle, and projecting the particle onto the constraint by updating a position of the particle along a gradient of a constraint function associated with the constraint using the Lagrange multiplier.

According to another embodiment, a computer system for simulating a dynamic object having a plurality of particles is disclosed. The computer system includes a memory operable for storing data and instructions of an application, and a processor communicatively coupled to the memory, where the processor is configured to perform, responsive to the instructions, a method of simulating a dynamic object. The method includes defining a current position and a current velocity for the particles, determining multipliers for a plurality of positional constraints of the particles over a plurality of iterations, where the multipliers regularize the positional constraints and correspond to an elastic potential energy of the constraints, and determining subsequent positions of the particles based on the current position, the plurality of positional constraints, and the multipliers.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
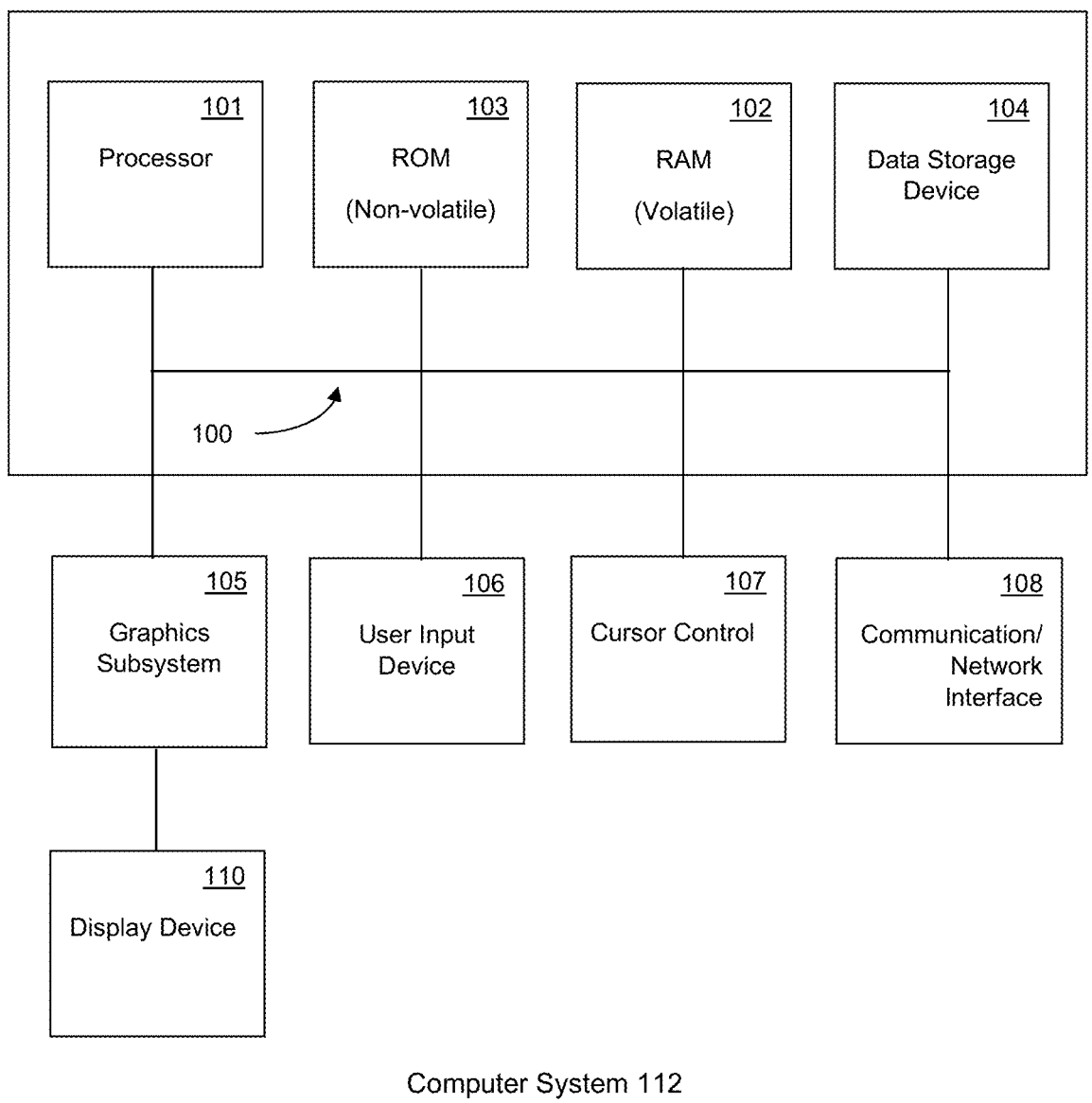
FIG. 1 is a block diagram of an exemplary computer system platform that can be used to execute a computer implemented simulation of deformable objects according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method, including a computer implemented method. Although steps and sequencing thereof are disclosed in a figure herein (e.g., FIGS. 5 and 6) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying," "calculating," "solving," "determining," "simulating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Systems and Methods for Position-Based Simulation of Compliant Constraints

Embodiments of the present invention are drawn to computer systems and computer implemented methods for performing physics-based simulations of deformable objects. The following discussion describes one such exemplary computer system platform that can be used to execute computer implemented methods as described herein.

In the example of FIG. 1, the exemplary computer system 112 includes a central processing unit (CPU) 101 for running software applications and optionally an operating system. Random access memory 102 and read-only memory 103 store applications and data for use by the CPU 101. Data storage device 104 provides non-volatile storage for applications and data and may include fixed disk drives, removable disk drives, flash memory devices, and CD-ROM, DVD-ROM or other optical storage devices. The optional user inputs 106 and 107 comprise devices that communicate inputs from one or more users to the computer system 112 (e.g., mice, joysticks, cameras, touch screens, and/or microphones). In accordance with embodiments of the present invention, the CPU 101 may execute instructions of a physics-based simulation, and the instructions may be stored in random access memory 102. For example, the CPU 101 may be configured to perform an algorithm for executing a PBD simulation loop using regularized constraints that directly correspond to well-defined energy potentials, and which can advantageously be solved independently of time step and iteration count (Algorithm 1 described with reference to Table I below).

A communication or network interface 108 allows the computer system 112 to communicate with other computer systems, networks, or devices via an electronic communications network, including wired and/or wireless communication and including an Intranet or the Internet. The display device 110 is optional and may be any device capable of displaying visual information in response to a signal from the computer system 112 and may include a flat panel touch sensitive display, for example. In one embodiment, the display device 110 can be used to display results of the computer simulations as described herein. The components of the computer system 112, including the CPU 101, memory 102/103, data storage 104, user input devices 106, and graphics subsystem 105 may be coupled via one or more data buses 100.

In the embodiment of FIG. 1, a graphics sub-system 105 may be coupled with the data bus and the components of the computer system 112. The data bus may be used to communicate data (e.g., matrices) between the host computer system and a device, such as a graphics processing unit (GPU), for processing by the GPU. The graphics sub-system may comprise a physical GPU and graphics/video memory. Graphics sub-system 105 can output display data to display device 110. The GPU may contain one or many individual cores, therefore, the GPU may be multi-core and there may be more than one physical GPU included in the graphics sub-system 105.

The physical GPU of graphics sub-system 105 can be configured as multiple virtual GPUs that may be used in parallel (e.g., concurrently) by a number of applications or processes executing in parallel, or multiple physical GPUs may be used simultaneously. In accordance with embodiments of the present invention, the graphics sub-system 105 may execute instructions of a physics-based simulation using a plurality of the above-described processing cores of the GPU. For example, the graphics sub-system 105 may be configured to perform Algorithm 1. In certain embodiments, the CPU and the GPU can operate in conjunction to execute the physics-based simulations described herein.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Elastic Potential Energy Model for Position Based Dynamics

Existing PBD approaches implement a constraint solver to calculate a position change $\Delta x$ for each constraint using the equation:

$$\Delta x = k_j s_j M^{-1} \nabla C_j(x_i).$$

The subscript notation i represents the iteration index, j represents the constraint index, and k represents the constraint stiffness applied as a multiplier on each constraint correction. When scaling the position change based on the value of k, it is appreciated that the effective constraint stiffness depends on both: 1) the time step; and 2) the number of constraint projections performed. In this way, existing PBD approaches are iteration count dependent and fail to account for the time step. Furthermore, these approaches generally do not converge to a well-defined solution in the case of multiple constraints. Therefore, embodiments of the present invention include a method for simulating deformable objects using regularized constraints that have a direct correspondence to well-defined energy potentials, and moreover, where the constraints can be advantageously solved independently of the associated time step and iteration count.

Figure 2:
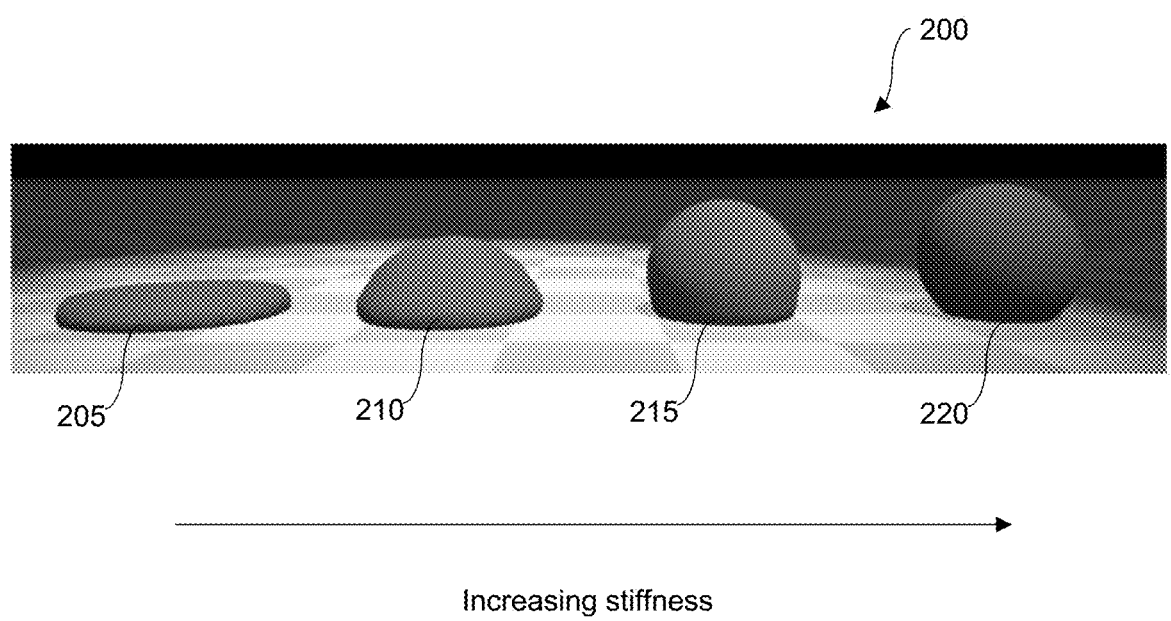
FIG. 2 is a diagram depicting an exemplary simulated 3D scene including a deformable object (e.g., an inflatable balloon) simulated using different iteration counts, according to embodiments of the present invention.

With regard to FIG. 2, an exemplary simulated scene 200 including a deformable object (e.g., an inflatable balloon) is depicted according to embodiments of the present invention. In accordance with embodiments of the present invention, the object is deformed and rendered according to a position-based simulation of compliant constraints. The exemplary deformable object in scene 200 is simulated multiple times, each time using different simulation variables, as depicted by exemplary objects 205, 210, 215, and 220. These objects illustrate the effects of the relative "stiffness" of volume conservation, as well as stretch and shear constraints when executing a position-based computer simulation. More specifically, in order to illustrate embodiments of the present invention, the interior air pressure of the deformable object is modeled using a global volume constraint, and the outer surface of the deformable object is modeled as a cloth mesh with stretch, shear, and bending constraints. As such, the relative stiffness of constraints can be easily adjusted to obtain stronger volume preservation, for example, without affecting surface stiffness.

According to embodiments of the present invention, the stiffness of the objects 205, 210, 215, and 220 may be advantageously defined in a time step and iteration count independent manner, thereby greatly simplifying asset creation. For example, each deformable object 205, 210, 215, and 220 may be assigned stiffness values independent of one another, where the resultant object is unaffected by time step and iteration count. In this way, as depicted in FIG. 2, deformable objects 205, 210, 215, and 220 are deformed differently according to their respective stiffness values, where the objects on the left side (e.g., deformable object 205) have a lower relative stiffness value than the objects on the right side (e.g., deformable object 220). Therefore, the objects on the left side deform to a greater extent than the objects on the right side based on their relative stiffness values.

Furthermore, embodiments of the present invention provide an extension to existing PBD approaches for accurately and efficiently simulating arbitrary elastic and dissipative energy potentials in an implicit manner. Moreover, some embodiments provide constraint force estimates, which can be used by applications to provide haptic user-feedback based on the constraint force estimates, for example, using a haptic feedback device capable of producing a physical force.

Table I

Algorithm 1 simulation loop

1: predict position $\tilde{x} \Leftarrow x^n + \Delta t v^n + \Delta t^2 M^{-1} F_{ext}(x^n)$
2:
3: initialize solve $x_0 \Leftarrow \tilde{x}$
4: initialize multipliers $\lambda_0 \Leftarrow 0$
5: while i < solverIterations do
6:    for all constraints do
7:       compute $\Delta \lambda$ using Eq (18)
8:       compute $\Delta x$ using Eq (17)
9:       update $\lambda_{i+1} \Leftarrow \lambda_i + \Delta \lambda$
10:      update $x_{i+1} \Leftarrow x_i + \Delta x$
11:    end for
12:    i $\Leftarrow$ i + 1
13: end while
14:
15: update postitions $x^{n+1} \Leftarrow x_i$ 16: update velocities $v^{n+1} \Leftarrow \frac{1}{\Delta t}(x^{n+1} - x^n)$ Table I above depicts an exemplary computer executable pseudocode implementation of Algorithm 1 for executing a PBD simulation loop using regularized constraints that directly correspond to well-defined energy potentials, and which can advantageously be solved independently of time step and iteration count. Constraints are kinematic restrictions that constrain the relative motion of bodies, and are generally represented as functions of position and orientation variables, linear and angular velocities, and the derivatives thereof to any order.

With regard to Algorithm 1, lines 4, 7, and 9 represent improvements over existing approaches to PBD, in accordance with embodiments of the present invention. Specifically, line 4 initializes a Lagrange multiplier using a value of zero for a first Newton iteration. Line 7 computes the Lagrange multiplier change $\Delta \lambda$ of a constraint equation using Equation 6 defined below, where $\Delta \lambda$ represents the incremental change in force applied to a constraint during an iteration, and the total amount of force $\lambda$ applied to the constraint is updated based on the incremental value. Line 9 updates the Lagrange multiplier by summing the current Lagrange multiplier with the Lagrange multiplier change $\Delta \lambda$ for a constraint computed using Equation 6. According to some embodiments, lines 7-12 are performed for a plurality of constraints prior to updating position $x^{n+1}$ and velocity $v^{n+1}$ in lines 15 and 16, respectively.

Algorithm 1 is derived from Newton's equations of motion subject to forces derived from an energy potential U(x):

$$M\ddot{x} = -\nabla U^T(x)$$

The value of $x=[x1, x2, \ldots, x3]^T$ represents the system state, such as particle positions, or any generalized coordinate model (e.g., rigid body transformations). Moreover, the gradient operator $\nabla$ indicates a row vector of partial derivatives.

An implicit position-level time discretization of the equations of motion yields the equation:

$$M\left(\frac{x^{n+1} - 2x^n + x^{n-1}}{\Delta t^2}\right) = -\nabla U^T(x^{n+1})$$

where the superscript n denotes the time step index. The energy potential U(x) may be specified in terms of a vector of constraint functions $C=[C_1(x), C_2(x), \ldots, C_m(x)]^T$ as (Equation 1):

$$U(x) = \frac{1}{2}C(x)^T \alpha^{-1} C(x)$$

where $\alpha$ is a block diagonal compliance matrix corresponding to inverse stiffness. The force from an elastic potential is given by the negative gradient of U with respect to x:

$$f_{elastic} = -\nabla_x U^T = -\nabla C^T \alpha^{-1} C$$

This equation is converted to a compliant constraint formulation, and the force is decomposed into direction and scalar components by the introduction of a Lagrange multiplier:

$$\lambda_{elastic} = -\tilde{\alpha}^{-1} C(x)$$

The term $\lambda_{elastic} = [\lambda_1, \lambda_1, \ldots, \lambda_m]^T$ is a vector of constraint multipliers, and is referred to as $\lambda$ here forward. Substituting the expression for $\lambda$ into the energy potential formula above yields the following discrete constrained equations of motion:

$$M(x^{n+1} - \tilde{x}) - \nabla C(x^{n+1})^T \lambda^{n+1} = 0$$

$$C(x^{n+1}) + \tilde{\alpha}\lambda^{n+1} = 0$$

where $\tilde{x} = 2x^n - x^{n-1} = x^n + \Delta t v^n$ is referred to as the predicted or inertial position. The top discrete constrained equation of motion is referred to as function $g(x, \lambda)$, and the bottom discrete constrained equation of motion is referred to as function $h(x, \lambda)$. These functions are used to determine values of x and $\lambda$ that satisfy:

$$g(x, \lambda) = 0$$

$$h(x, \lambda) = 0$$

The above equations are linearized to obtain the following Newton subproblem:

$$\begin{bmatrix} K & -\nabla C^T(x_i) \\ \nabla C(x_i) & \tilde{\alpha} \end{bmatrix} \begin{bmatrix} \Delta x \\ \Delta \lambda \end{bmatrix} = -\begin{bmatrix} g(x_i, \lambda_i) \\ h(x_i, \lambda_i) \end{bmatrix}$$

where $$K = \frac{\partial g}{\partial x}.$$

This system can be solved for $\Delta x$ and $\Delta \lambda$, and the positions and multipliers are updated according to:

$$\lambda_{i+1} = \lambda_i + \Delta \lambda \quad \text{(Equation 2)}$$

$$x_{i+1} = x_i + \Delta x \quad \text{(Equation 3)}$$

This fixed-point iteration satisfies the discrete constrained equations of motion defined above for any sequence such that $|x_{i+1} - x_i| \to 0$ and $|\lambda_{i+1} - \lambda_i| \to 0$. In one embodiment, this computer implemented method may require a line search strategy to achieve robustness, and computing the system matrix may be relatively expensive. However, the performance of the method can be improved by avoiding the computation of K, which requires the evaluation of constraint Hessians.

Accordingly, two approximations are introduced to simplify the implementation of the method and connect the method back to existing methods of PBD. The first approximation is that $K \approx M$, which omits the geometric stiffness constraint Hessian terms, and introduces a local error on the order of $O(\Delta t^2)$. This approximation may be considered a quasi-Newton method that changes the rate of convergence, but does not change the global error or solution to the fixed-point iteration. The other approximation assumes that $g(x_i, \lambda_i) = 0$. This assumption can be justified based on the fact that it is trivially true for the first Newton iteration when initialized with $x_0 = \tilde{x}$ and $\lambda_0 = 0$.

Including these approximations, an updated linear subproblem is given by:

$$\begin{bmatrix} M & -\nabla C^T(x_i) \\ \nabla C(x_i) & \tilde{\alpha} \end{bmatrix} \begin{bmatrix} \Delta x \\ \Delta \lambda \end{bmatrix} = -\begin{bmatrix} 0 \\ h(x_i, \lambda_i) \end{bmatrix}$$

Taking the Schur complement with respect to M yields the following reduced system in terms of the unknown $\Delta \lambda$ (Equation 4):

$$[\nabla C(x_i) M^{-1} \nabla C(x_i)^T + \tilde{\alpha}] \Delta \lambda = -C(x_i) - \tilde{\alpha} \lambda_i$$

The position update can then be directly determined by evaluating (Equation 5):

$$\Delta x = M^{-1} \nabla C(x_i)^T \Delta \lambda$$

This update is performed at line 8 of the pseudocode implementation of the PBD simulation loop depicted in Table I, and the next position is determined based on the updated position according to line 10 of the algorithm.

Solving Constraint Equations for PBD

In the existing PBD approach, a non-linear Gauss-Seidel solution may be used to solve each constraint equation separately. Each constraint yields a single scalar equation for all associated particle positions. Accordingly, the elastic potential energy model described above can advantageously connect back to PBD by considering a Gauss-Seidel solution for the linear system of equations in Equation 4. Taking a single constraint equation with index j, the Lagrange multiplier change $\Delta \lambda_j$ of the constraint equation can be directly computed by evaluating (Equation 6):

$$\Delta \lambda_j = \frac{-C_j(x_i) - \tilde{\alpha}_j \lambda_{ij}}{\nabla C_j M^{-1} \nabla C_j^T + \tilde{\alpha}_j}$$

For solving constraints, $\Delta \lambda_j$ is calculated for a single constraint and the multipliers and system positions are updated using Equation 2 and Equation 3 as described above and represented in Table I at lines 7 and 8, respectively.

Referring to Equation 6 above, in the case of $\alpha_j = 0$, the value of $\Delta \lambda_j$ corresponds to the scaling factor $s_j$ in the existing PDB approach. The scaling factor $s_j$ is the incremental Lagrange multiplier change for an infinitely stiff constraint. In the case of compliance, where $\alpha_j \geq 0$, the term $-\tilde{\alpha}_j \lambda_{ij}$ appears in the numerator, and the term $-\tilde{\alpha}_j$ appears in the denominator. These terms act to regularize the constraint in such a way that the constraint force is limited and corresponds to the elastic potential given by Equation 1 above. The numerator of Equation 6 also includes $\lambda_{ij}$ representing the total Lagrange multiplier for constraint j at the current iteration i, which provides useful information regarding the total constraint force that can be used to drive force dependent effects, such as breakable joints and haptic devices. This variable is updated and stored in addition to the system positions, and consumes relatively modest overhead.

Constraint Damping Model

Embodiments of the present invention provide methods derived from an implicit time stepping scheme, where some dissipation of mechanical energy occurs naturally over time. Nevertheless, additional constraint damping can be modeled by defining a Rayleigh dissipation potential:

$$D(x, v) = \frac{1}{2} \dot{C}(x)^T \beta \dot{C}(x)$$

$$= \frac{1}{2} v^T \nabla C^T \beta \nabla C v,$$

where $\beta$ is a block diagonal matrix corresponding to the constraint damping coefficients. The value of $\beta$ should be set according to a damping stiffness and is not an inverse parameter like compliance. This equation can be represented according to Lagrangian dynamics, where the force from a dissipation potential is derived from the negative gradient of D with respect to velocity. The scalar component of the force vector is separated into a constraint multiplier to give:

$$\lambda_{damp} = -\tilde{\beta} \dot{C}(x) = -\tilde{\beta} \nabla C v$$

This equation includes the time step in the damping parameter by defining $\tilde{\beta} = \Delta t^2 \beta$. To determine the total constraint force, the multipliers can be combined into a single equation, as the damping force acts along the same direction as the elastic force:

$$\lambda = \lambda_{elastic} + \lambda_{damp} = -\tilde{\alpha}^{-1} C(x) - \tilde{\beta} \nabla C v$$

This equation can be rearranged into the discrete constrained equation of motion $h(x, \lambda)$ above to give:

$$h(x,\lambda) = C(x) + \tilde{\alpha}\lambda + \tilde{\alpha}\tilde{\beta}\nabla Cv = 0$$

Further, the discrete approximation of velocity $$v = \frac{1}{\Delta t}(x^{n+1} - x^n)$$

may be substituted into the above equation, and after linearizing with respect to $\lambda$, the updated Newton step is given by:

$$\left[\left(I + \frac{\tilde{\alpha}\tilde{\beta}}{\Delta t}\right)\nabla C(x_i)M^{-1}\nabla C(x_i)^T + \tilde{\alpha}\right]\Delta\lambda = -h(x_i, \lambda_i)$$

This equation can be rewritten in terms of a single constraint equation to give the Gauss-Seidel update:

$$\Delta\lambda_j = \frac{-C_j(x_i) - \tilde{\alpha}_j\lambda_{ij} - \gamma_j\nabla C_j(x_i - x^n)}{(1 + \gamma_j)\nabla C_j M^{-1}\nabla C_j^T + \tilde{\alpha}_j}$$

For the common case where $\tilde{\alpha}$ and $\tilde{\beta}$ are simple diagonal (e.g., not block-diagonal), the time step scaled product of compliance and damping parameters for the constraint is represented as:

$$\gamma_j = \frac{\tilde{\alpha}_j\tilde{\beta}_j}{\Delta t}$$

According to some embodiments, St. Venant-Kirchhoff triangular finite element methods (FEM) discretization and linear isotropic constitutive models may be simulated. For such a linear isotropic constitutive model, the entries of the strain tensor $\epsilon$ for each element can be treated as a vector of constraint functions and represented by a Voigt notation for a triangular element:

$$C_{tri}(x) = \epsilon_{tri} = \begin{bmatrix} \epsilon_x \\ \epsilon_y \\ \epsilon_{xy} \end{bmatrix}$$

The compliance matrix can then be determined from the inverse stiffness matrix, which can be represented in Lame parameters as:

$$\alpha_{tri} = K^{-1} = \begin{bmatrix} \lambda + 2\mu & \lambda & 0 \\ \lambda & \lambda + 2\mu & 0 \\ 0 & 0 & 2\mu \end{bmatrix}^{-1}$$

This formulation not only corresponds to traditional material parameters, but also correctly couples individual strains to model Poisson's effect, which allows embodiments of the present invention to accurately simulate models with material properties obtained from experimental data.

Figure 3:
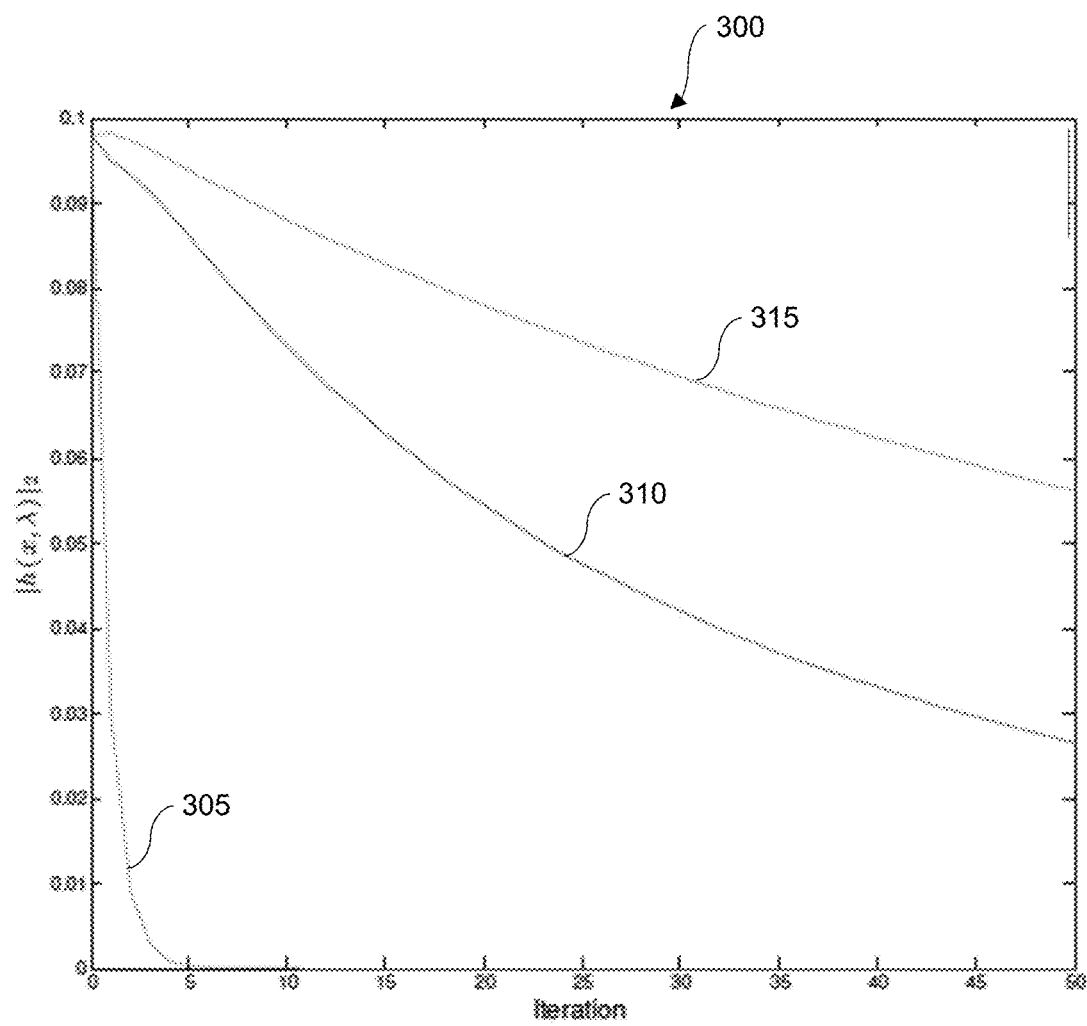
FIG. 3 is a graph depicting the residual error of a discrete constrained equation of motion $h(x,\lambda)$ for a single frame of an exemplary object simulation according to embodiments of the present invention.

With regard to FIG. 3, a graph 300 depicting the residual error of the discrete constrained equation of motion $h(x, \lambda)$ for a single frame of an exemplary objected simulation is depicted according to embodiments of the present invention and compared to the residual error of a common Newton method. As depicted, line 305 charts the residual error of the common Newton method for simulating the object, line 310 charts the residual error when the object is simulated by a position-based simulation of compliant constraints using a Gauss-Seidel update according to embodiments of the present invention, and line 315 charts the residual error when the object is simulated by a position-based simulation of compliant constraints using a Jacobi update according to embodiments of the present invention. As depicted in FIG. 3, both the Gauss-Seidel update (line 310) and the Jacobi update (line 315) converge linearly, as expected for an iterative method.

Figure 4:
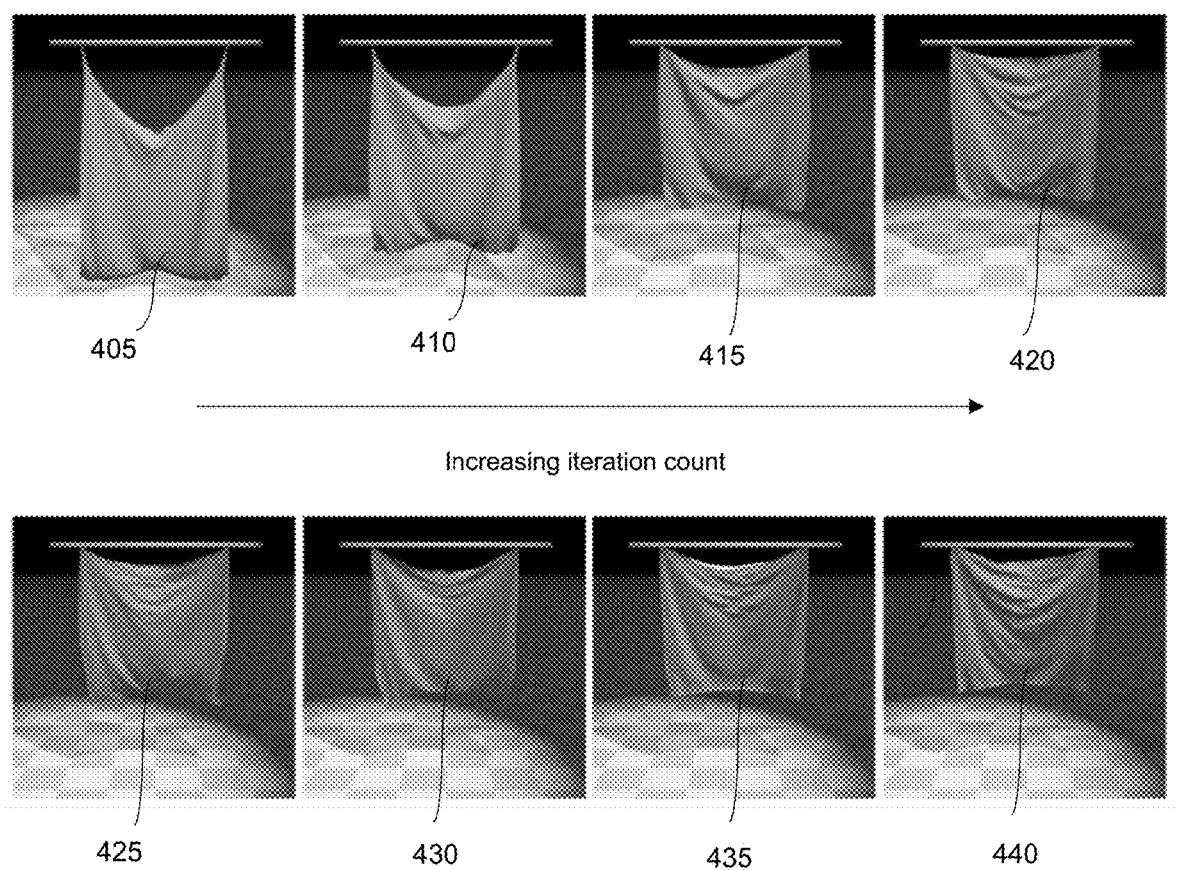
FIG. 4 is a diagram depicting a series of hanging cloth objects simulated according to embodiments of the present invention.

FIG. 4 depicts a series of hanging cloth objects 405-440 simulated using different iteration counts, where cloth objects 405-420 are simulated using existing position-based simulation techniques, and cloth objects 425-440 are simulated using a position-based simulation of compliant constraints that corresponds to an elastic potential energy model according to embodiments of the present invention. Cloth objects 405/425 410/740, 415/435, and 420/440 are simulated using iteration counts of 20, 40, 80, and 160, respectively. In the example of FIG. 4, the stiffness constraint has been set to a relatively low value of k=0.01 to better illustrate the effects of iteration count.

A 64×64 exemplary grid of particles connects by a graph of 24,000 distance constraints is used to simulate the cloth objects 405-440, where the iteration count is varied (increasing from left to right) and the stiffness constraint remains fixed. As depicted in FIG. 4, the simulated cloth objects 405-420 simulated using existing position-based simulation techniques are iteration count dependent, becoming progressively stiffer and more heavily damped as the iteration count increases. Conversely, the simulated cloth objects 425-440 simulated according to embodiments of the present invention are iteration count independent and therefore retain the same general shape and position regardless of the iteration count used to simulate the object.

Figure 5:
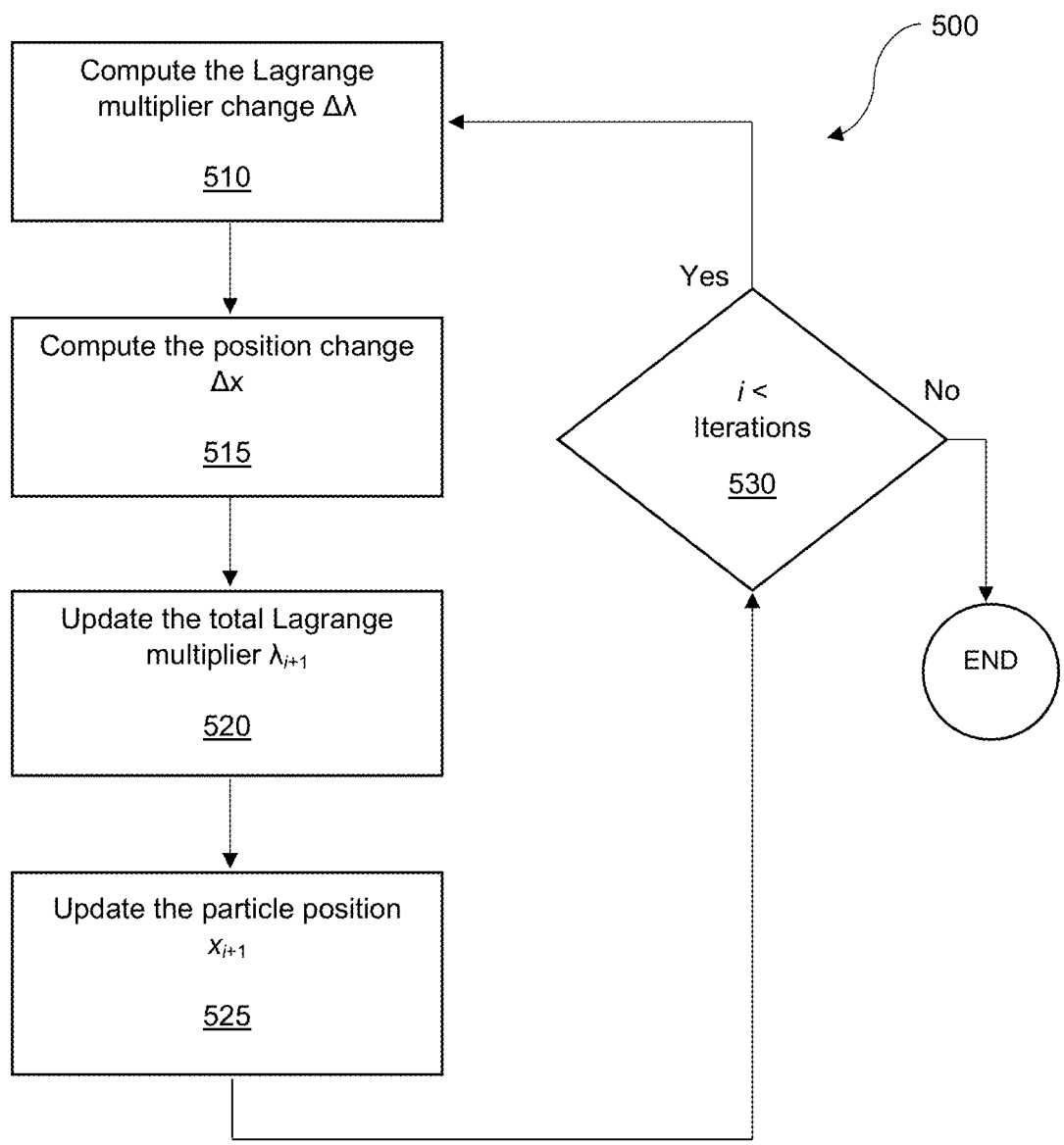
FIG. 5 is a flow-chart depicting an exemplary sequence of computer implemented steps for updating particle positions of constrained particles of a deformable object according to embodiments of the present invention.

With regard to FIG. 5, a flow-chart of an exemplary sequence of computer implemented steps 500 for solving positional constraints to update particle positions of a deformable object is depicted according to embodiments of the present invention. It is appreciated that method 500 can be implemented on the computer system shown in FIG. 1, for instance. According to the sequence of computer implemented steps 500, at step 510, the value of the Lagrange multiplier change for a constraint of the particle, such as a stretch or shear constraint, is computed. According to some embodiments, the Lagrange multiplier change $\Delta\lambda$ for a constraint j is computed as:

$$\Delta\lambda_j = \frac{-C_j(x_i) - \tilde{\alpha}_j\lambda_{ij}}{\nabla C_j M^{-1}\nabla C_j^T + \tilde{\alpha}_j}$$

where, for constraint j at the current iteration i, $C_j$ represents a constraint function, $x_i$ represents a system state (e.g., a particle position), $\alpha$ is a block diagonal compliance matrix corresponding to inverse stiffness, $\lambda_{ij}$ represents the total Lagrange multiplier, M represents the mass of an object or particle, and the gradient operator $\nabla$ indicates a row vector of partial derivatives.

At step, 515, the position change Δx for the particle is computed based on the computed Lagrange multiplier change Δλ, for example, using the equation:

$$\Delta x = M^{-1} \nabla C(x_i)^T \Delta \lambda$$

At step 520, a total Lagrange multiplier λ for the constraint is updated using the computed Lagrange multiplier change Δλ as $\lambda_{i+1} = \lambda_i + \Delta\lambda$ and at step 525, the particle position x is updated using the computed position change Δx as $x_{i+1} = x_i + \Delta x$. At step 530, it is determined if the current iteration i is less than the specified iteration count, and if so, steps 510-525 are performed again for a subsequent iteration until the intended number of iterations is reached. The number of iterations selected can be predetermined, user controlled, or adaptive. Furthermore, the above steps may be repeated for a subsequent constraint of the particle until all constraints have been solved and their individual contributions accounted for.

Figure 6:
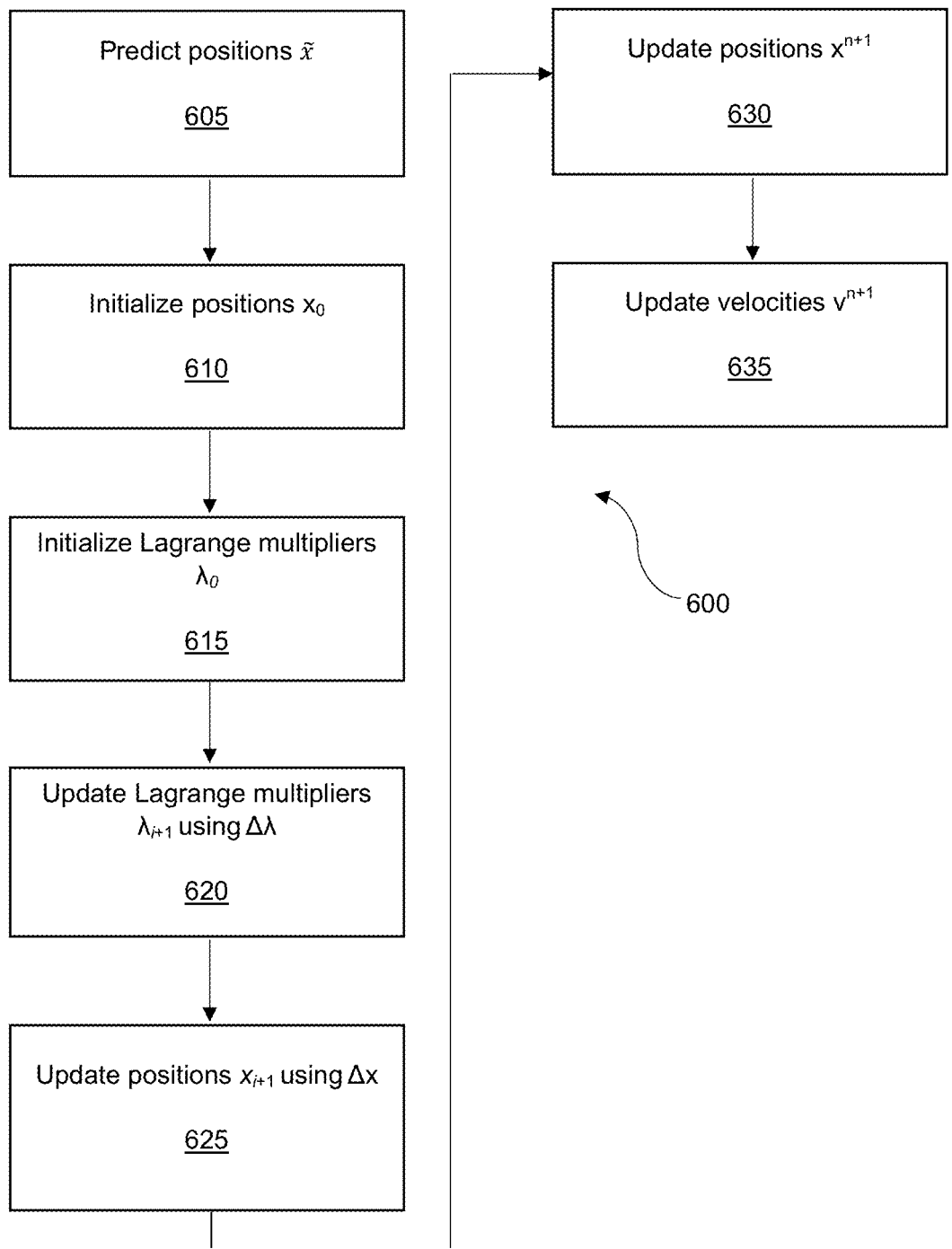
FIG. 6 is a flow-chart depicting an exemplary computer implemented position-based dynamics simulation loop for determining positions and velocities of particles according to embodiments of the present invention.

With regard to FIG. 6, a flow-chart of an exemplary sequence of computer implemented steps 600 for executing a position-based dynamics simulation loop to determine positions and velocities of particles based on an incremental force magnitude applied to constraints of the particles is depicted according to embodiments of the present invention. It is appreciated that method 600 can be implemented on the computer system shown in FIG. 1, for instance. According to the sequence of computer implemented steps 600, at step 605, a predicted particle position x̃ is computed according to $\tilde{x} = 2x^n - x^{n-1} = x^n + \Delta t v^n$. The predicted particle position x̃ stores the systems state (e.g., particle positions), and may represent any generalized coordinate model, (e.g.: rigid body transforms). The formula is a variation of Implicit Euler, where n is a step index and $1 \leq n \leq N$, N is a number of portions for dividing time T using interval Δt. At step 610, an initial position value of a particle is initialized to the predicted particle position x̃. At step 615, the initial value of $\lambda_0$ for a first iteration is initialized to zero.

At step 620, total Lagrange multipliers for constraints of the particles are updated according to a Lagrange multiplier change Δλ as described above with regard to FIG. 5, where the total Lagrange multiplier $\lambda_{i+1}$ is updated based on the Lagrange multiplier change Δλ according to $\lambda_{i+1} = \lambda_i + \Delta\lambda$. At step 625, the position change Δx is used to update the total particle position $x_{i+1}$ according to $x_{i+1} = x_i + \Delta x$. Steps 620 and 625 are iteratively repeated for a specified number of iterations for each constraint of the particle until all constraints are solved and their individual contributions accounted for. Subsequently, at step 630, a next position $x^{n+1}$ of the particle is updated according to the total particle position $x_{i+1}$ computed for the constraints, and at step 635, next velocities of the particle $v^{n+1}$ are updated according to the next position $x^{n+1}$.

Embodiments of the present invention are thus described. While the present invention has been described in particular embodiments, it should be appreciated that the present invention should not be construed as limited by such embodiments, but rather construed according to the following claims.

What is claimed is:

1. A computer-implemented method of simulating a deformable object comprising a plurality of particles, the method comprising:
   a) defining a current position and a current velocity for a particle among the plurality of particles;
   b) generating an estimated next position for the particle based on the current position and the current velocity;
   c) computing an incremental constraint force magnitude of a constraint based on a total constraint force magnitude of the constraint, the constraint being one of a plurality of constraints corresponding to the particle;
   d) computing an incremental position change of the constraint using the incremental constraint force magnitude;
   e) updating the total constraint force magnitude of the constraint to include the incremental constraint force magnitude;
   f) updating a total position change of the constraint to include the incremental position change;
   g) updating the estimated next position based on the total position change of the constraint and then computing a next position and a next velocity for the particle based on the current position and the estimated next position; and
   (h) rendering the deformable object based at least in part on the next position and the next velocity for the particle.

2. The computer-implemented method as described in claim 1, wherein the operations c)-f) are performed for each of the plurality of constraints, prior to performing the operation g).

3. The computer-implemented method as described in claim 1, wherein a stiffness characteristic of the constraint remains fixed when an iteration number of a plurality of iterations changes, each iteration including of the plurality of iterations including at least the operations b)-g).

4. The computer-implemented method as described in claim 1, wherein a plurality of iterations are performed over a time step, each iteration of the plurality of iterations including at least the operations b)-g), and wherein a stiffness characteristic of the constraint remains fixed when a length of the time step changes.

5. The computer-implemented method as described in claim 1, wherein the computing the incremental constraint force magnitude comprises computing a damping force of the constraint.

6. The computer-implemented method as described in claim 1, further comprising initializing the total constraint force magnitude to zero.

7. The computer-implemented method as described in claim 1, further comprising providing instructions to a haptic feedback device for producing a physical force based on the total constraint force magnitude.

8. The computer-implemented method as described in claim 1, wherein the computing the incremental position change of the constraint using the incremental constraint force magnitude of the constraint comprises evaluating the equation:

$$\Delta x = M^{-1} \nabla C(x_1)^T \Delta \lambda$$

where Δx represents the incremental position change, M represents mass, C represents a vector of constraints, $x_i$, represents a particle position during a respective iteration i, and λ, represents a Lagrange multiplier, wherein the respective iteration corresponds to execution of at least the operations b)-g).

9. The computer-implemented method as described in claim 1, wherein the computing the incremental constraint force magnitude comprises evaluating the equation:

$$\Delta \lambda_j = \frac{-C_j(x_i) - \tilde{\alpha}_j \lambda_{ij}}{\nabla C_j M^{-1} \nabla C_j^T + \tilde{\alpha}_j},$$

where, for constraint j during a respective iteration i, $C_j$ represents a constraint function, $x_i$ represents a particle position, $\tilde{\alpha}_j$ is a block diagonal compliance matrix corresponding to inverse stiffness for constraint j, $\lambda_{ij}$ represents the total Lagrange multiplier, M represents the mass of a particle, $\Delta\lambda_j$ represents the incremental constraint force magnitude, and the gradient operator $\nabla$ indicates a row vector of partial derivatives, wherein the respective iteration corresponds to execution of at least the operations b)-g).

10. The computer-implemented method as described in claim 1, wherein the computing the incremental constraint force magnitude comprises performing a Gauss-Seidel solution.

11. A computer-implemented method of simulating a dynamic object comprising a plurality of particles, the method comprising:
  defining current positions and current velocities for the plurality of particles;
  determining multipliers for a plurality of positional constraints of the plurality of particles based at least in part on computing an incremental multiplier at each iteration of a plurality of iterations and updating the multipliers, wherein the multipliers regularize the plurality of positional constraints and correspond to an elastic potential energy of the constraints; and
  determining estimated subsequent positions of the plurality of particles based on the current positions, the plurality of positional constraints, and the multipliers;
  computing next positions and next velocities for the plurality of particles based on the current positions and the estimated subsequent positions; and
  rendering the dynamic object based at least in part on the next positions and the next velocities for the plurality of particles.

12. The computer-implemented method as described in claim 11, wherein the determining the multipliers for the plurality of positional constraints comprises computing a damping force of the plurality of positional constraints.

13. The computer-implemented method as described in claim 11, wherein a stiffness characteristic of the plurality of positional constraints remains fixed when a number of the plurality of iterations changes.

14. The computer-implemented method as described in claim 11, wherein the plurality of iterations are performed over a time step and wherein a stiffness characteristic of the plurality of positional constraints remains fixed when a length of the time step changes.

15. The computer-implemented method as described in claim 11, wherein the multipliers comprise Lagrange multipliers, and further comprising initializing the multipliers to zero.

16. The computer-implemented method as described in claim 11, further comprising providing instructions to a haptic feedback device for producing a physical force based on the multipliers.

17. The computer-implemented method as described in claim 11, wherein the method is executed in a computer simulation.

18. The computer-implemented method as described in claim 11, wherein the determining the estimated subsequent positions of the plurality of particles comprises computing an incremental position change for each iteration of the plurality of iterations based on an incremental multiplier.

19. A computer system for simulating a dynamic object comprising a plurality of particles, the computer system comprising:
  one or more memory units operable for storing data and instructions of an application; and
  one or more processors communicatively coupled to the memory, wherein the one or more processors are configured to perform, responsive to the instructions, a method of simulating the dynamic object, the method comprising:
    defining current positions and current velocities for the plurality of particles;
    determining multipliers for a plurality of positional constraints of the plurality of particles based at least in part on computing an incremental multiplier at each iteration of a plurality of iterations and updating the multipliers, wherein the multipliers regularize the plurality of positional constraints and correspond to an elastic potential energy of the constraints; and
    determining estimated subsequent positions of the plurality of particles based on the current positions, the plurality of positional constraints, and the multipliers;
    computing next positions and next velocities for the plurality of particles based on the current positions and the estimated subsequent positions; and
    rendering the dynamic object based at least in part on the next positions and the next velocities for the plurality of particles.

20. The computer system as described in claim 19, wherein the determining the multipliers for the plurality of positional constraints comprises computing a damping force of the plurality of positional constraints.

21. The computer system as described in claim 19, wherein a stiffness characteristic of the plurality of positional constraints remains fixed when a number of the plurality of iterations changes.

22. The computer system as described in claim 19, wherein the plurality of iterations are performed over a time step, and wherein a stiffness characteristic of the plurality of positional constraints remains fixed when a length of the time step changes.

23. The computer system as described in claim 19, wherein the multipliers comprise Lagrange multipliers, and wherein the method further comprises initializing the multipliers to zero.

24. The computer system as described in claim 19, wherein the method further comprises providing instructions to a haptic feedback device for producing a physical force based on the multipliers.

25. The computer system as described in claim 19, wherein the operations correspond to a computer simulation.

26. The computer system as described in claim 25, wherein the determining the estimated subsequent positions of the plurality of particles comprises computing an incremental position change for each iteration of the plurality of iterations, and wherein the computing an incremental position change is based on the incremental multiplier.

27. The computer system as described in claim 19, wherein the one or more processors comprise a graphics processing unit.

* * * * *